United States Patent [19]
Cosimati

[11] Patent Number: 5,709,071
[45] Date of Patent: Jan. 20, 1998

[54] CHILI HARVESTER WITH ADJUSTABLE SPIRAL PICKER UNITS

[75] Inventor: Robert O. Cosimati, Las Cruces, N. Mex.

[73] Assignee: Crown Farming Systems Inc., Las Cruces, N. Mex.

[21] Appl. No.: 593,082

[22] Filed: Jan. 29, 1996

[51] Int. Cl.$^6$ .................................................. A01D 45/00
[52] U.S. Cl. .................................. 56/327.1; 56/330
[58] Field of Search .................................. 56/327.1, 330, 56/128, 130, 328.1; 460/142

[56] References Cited

U.S. PATENT DOCUMENTS

| | | | |
|---|---|---|---|
| 3,568,419 | 3/1971 | Creager | 56/19 |
| 4,546,602 | 10/1985 | Cosimati | 56/327 R |
| 4,913,680 | 4/1990 | Desmarais | 56/330 X |
| 5,210,999 | 5/1993 | Cosimati | 56/327.1 |

FOREIGN PATENT DOCUMENTS

1132831  1/1985  U.S.S.R. .................. 56/327.1

*Primary Examiner*—Terry Lee Melius
*Attorney, Agent, or Firm*—Jacobson, Price, Holman & Stern, PLLC

[57] ABSTRACT

A chili harvester in the form of a self propelled vehicle for movement along rows of chili pepper plants and includes spaced, opposed rotatably driven picking units. Each of the picking units is in the form of a plurality of vertically oriented spirally coiled pod picking rods. The spirally coiled rods are supported for lateral adjustment in relation to each other for varying the distance between opposed spirally coiled rods for optimizing the picking efficiency of the picking units and enabling the picking units to be adjusted to compensate for variations in picking conditions. The spirally coiled picking units are manually adjusted towards and away from each other to vary the spatial relation between the picking units. A paddle-type conveyor structure is associated with each picking unit for conveying chili pods removed from the chili plants rearwardly and upwardly onto a transverse conveyor which drops chili pods through an air gap onto a rearwardly and upwardly extending conveyor with pressurized air passing through the air gap to remove lightweight trash, debris and the like from the chili pods.

15 Claims, 5 Drawing Sheets

CHILI HARVESTER WITH ADJUSTABLE SPIRAL PICKER UNITS

BACKGROUND OF THE INVENTION

1. Field of the Invention

The present invention generally relates to a chili harvester in the form of a self propelled vehicle for movement along rows of chili pepper plants and includes spaced, opposed rotatably driven picking units. Each of the picking units is in the form of a plurality of vertically oriented spirally coiled pod picking rods. The spirally coiled rods are supported for lateral adjustment in relation to each other for varying the distance between opposed spirally coiled rods for optimizing the picking efficiency of the picking units and enabling the picking units to be adjusted to compensate for variations in picking conditions. The spirally coiled picking units are manually adjusted towards and away from each other to vary the spatial relation between the picking units. A paddle-type conveyor structure is associated with each picking unit for conveying chili pods removed from the chili plants rearwardly and upwardly onto a transverse conveyor which drops chili pods through an air gap onto a rearwardly and upwardly extending conveyor with pressurized air passing through the air gap to remove lightweight trash, debris and the like from the chili pods.

2. Description of the Prior Art

My prior U.S. Pat. Nos. 4,546,602 issued Oct. 15, 1985 and 5,210,999 issued May 18, 1993 disclose chili pepper harvesters with forwardly extending picking units combined with conveyor structures to collect the chili pods removed from the plants by the picking units and conveying the chili pods through a trash separation unit and sorting unit. U.S. Pat. No. 3,568,419 issued Mar. 9, 1971 discloses a chili harvester picking unit in the form of opposed rotatably driven spiral coils. The above patents and the prior art of record therein are incorporated herein by reference thereto.

The prior patents do not disclose a chili harvester incorporating the novel and unique features of the chili harvester disclosed in this application.

SUMMARY OF THE INVENTION

An object of the present invention is to provide a chili harvester having multiple picking units extending forwardly therefrom with each picking unit including a plurality of spaced and opposed spiral picking coils formed by a spiral rod that has its upper and lower ends laterally adjustably supported to enable opposed spiral coils to be adjusted toward and away from each other for more effective removal of chili pepper pods from chili pepper plants.

Another object of the invention is to provide a chili pepper harvester in accordance with the preceding object in which the opposed picking coils in each picking unit are counter-rotated for more effective removal of chili pepper pods from the plants.

A further object of the invention is to provide a chili pepper harvester in accordance with the preceding objects in which each spiral picking coil includes a central shaft having supporting bearings individually adjustably mounted on top and bottom plates with the top and bottom plates being manually adjusted to move all of the spiral picking coils on one side of a picking unit laterally in relation to the coils on the other side of a picking unit to vary the space between the picking units through which chili pepper plants pass for optimizing the picking efficiency of the picker units.

Still another feature of the chili harvester is the use of paddle conveyors for conveying the harvested chili pods rearwardly and upwardly for depositing on a transverse conveyor which drops the chili pods through an air gap onto a rearwardly and upwardly extending conveyor with the air gap being subjected to an air flow therethrough for entraining and removing trash and debris which may have been picked by the picking units with the air gap including vertically adjustable fingers on the downstream side of the air flow passing through the air gap to collect any chili pods which may have been entrained in the air flow.

Another significant object of the invention is to provide a chili harvester in accordance with the preceding objects in which each picking unit is provided with a floating leaf lifter at the forward end thereof for lifting the chili pepper plant leaves for entry between the picker units.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
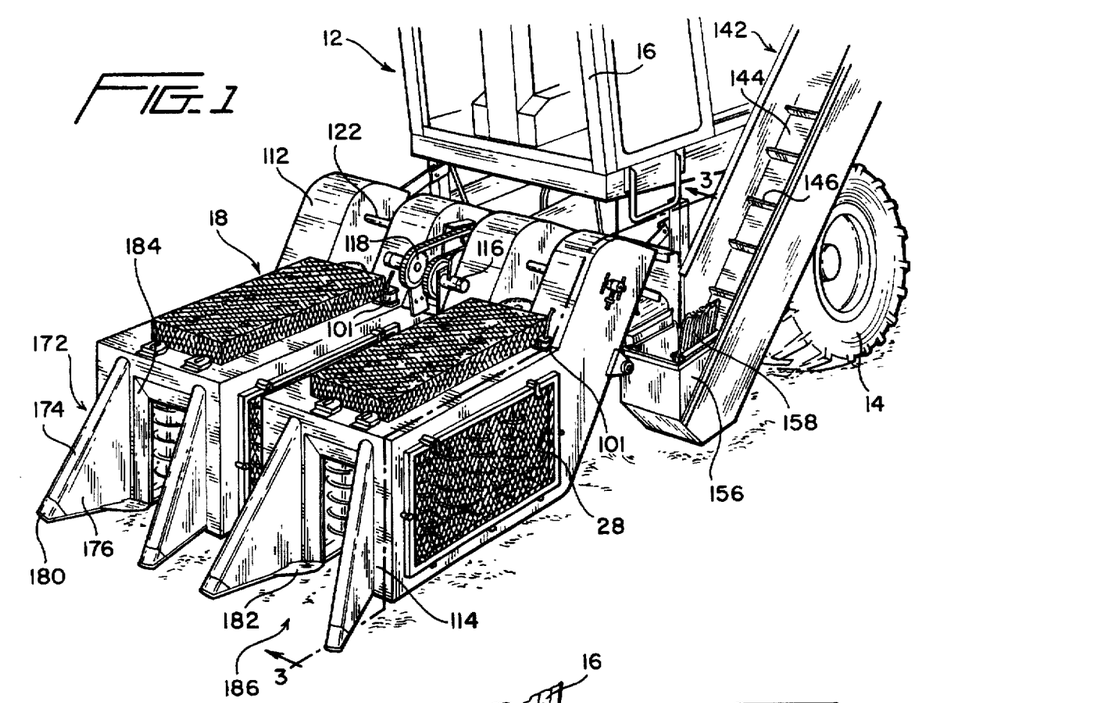
FIG. 1 is a perspective view of the forward end portion of a chili pepper harvester illustrating the picker units extending forwardly from a self propelled vehicle.
Figure 2:
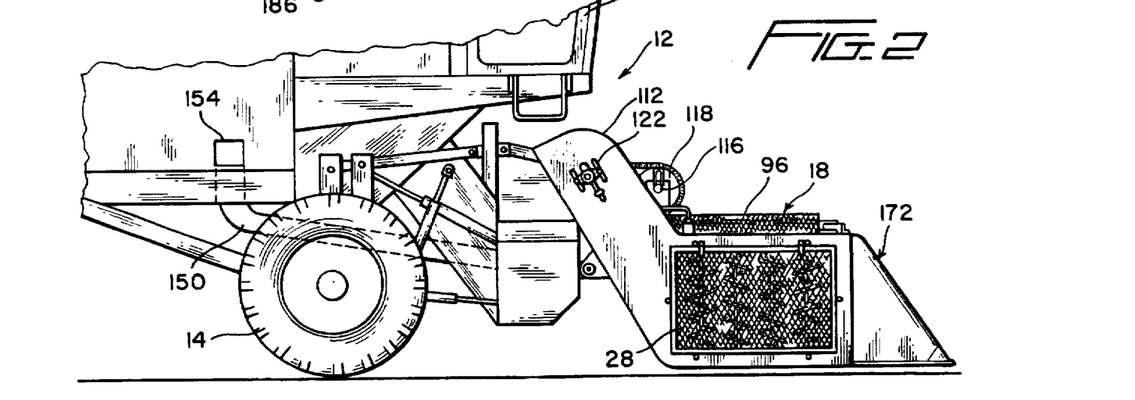
FIG. 2 is a side elevational view of the structure illustrated in FIG. 1.

The chili pepper harvester of the present invention is partially illustrated in FIGS. 1 and 2 and is designated by reference numeral 12. The rearward portion of the chili pepper harvester is the same as that disclosed in my U.S. Pat. No. 5,210,999. The chili pepper harvester 12 is in the form of a mobile vehicle including support wheels 14 and an operator's cab 16 in which controls are provided for operating the harvester. Projecting forwardly from the harvester is a pair of picker units 18 for straddling and removing chili pepper pods from two rows of chili pepper plants. The number of picker units 18 may vary and are of identical construction. The picker units may be angulated upwardly or oriented generally horizontally by frame structure and hydraulic lifting rams oriented in a manner to position the picker units 18 in generally horizontal relation adjacent to but above the ground surface.

Figure 3:
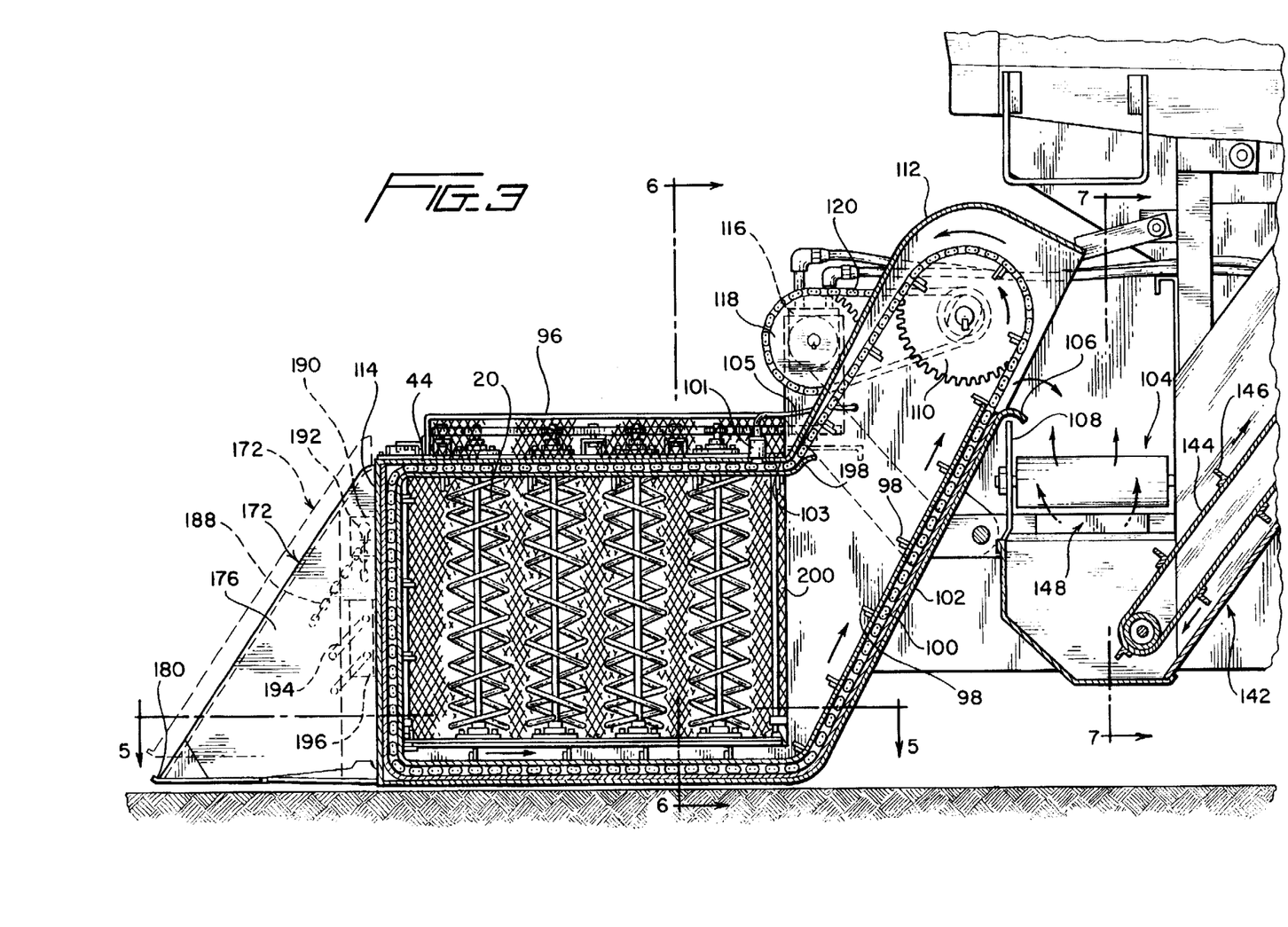
FIG. 3 is a longitudinal, vertical sectional view taken substantially upon a plane passing along section line 3—3 on FIG. 1 illustrating structural details of the picker unit and conveyor.
Figure 4:
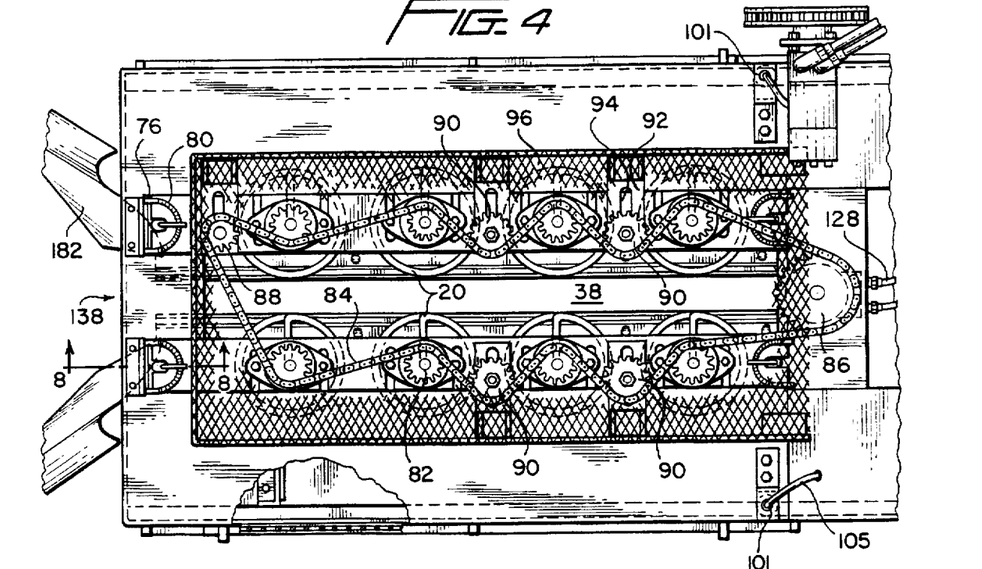
FIG. 4 is a top plan view of one of the picker units illustrating the drive structure for the spiral coils.
Figure 5:
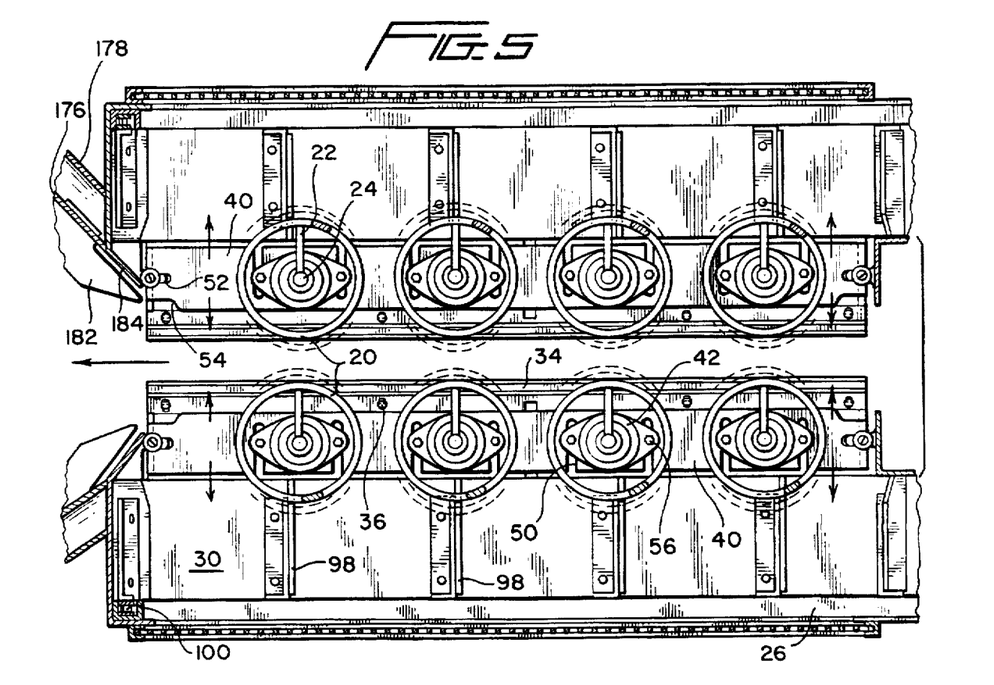
FIG. 5 is a plan sectional view substantially along section line 5—5 on FIG. 3 illustrating the mounting plates and mounting structure for the lower ends of the spiral coils.
Figure 6:
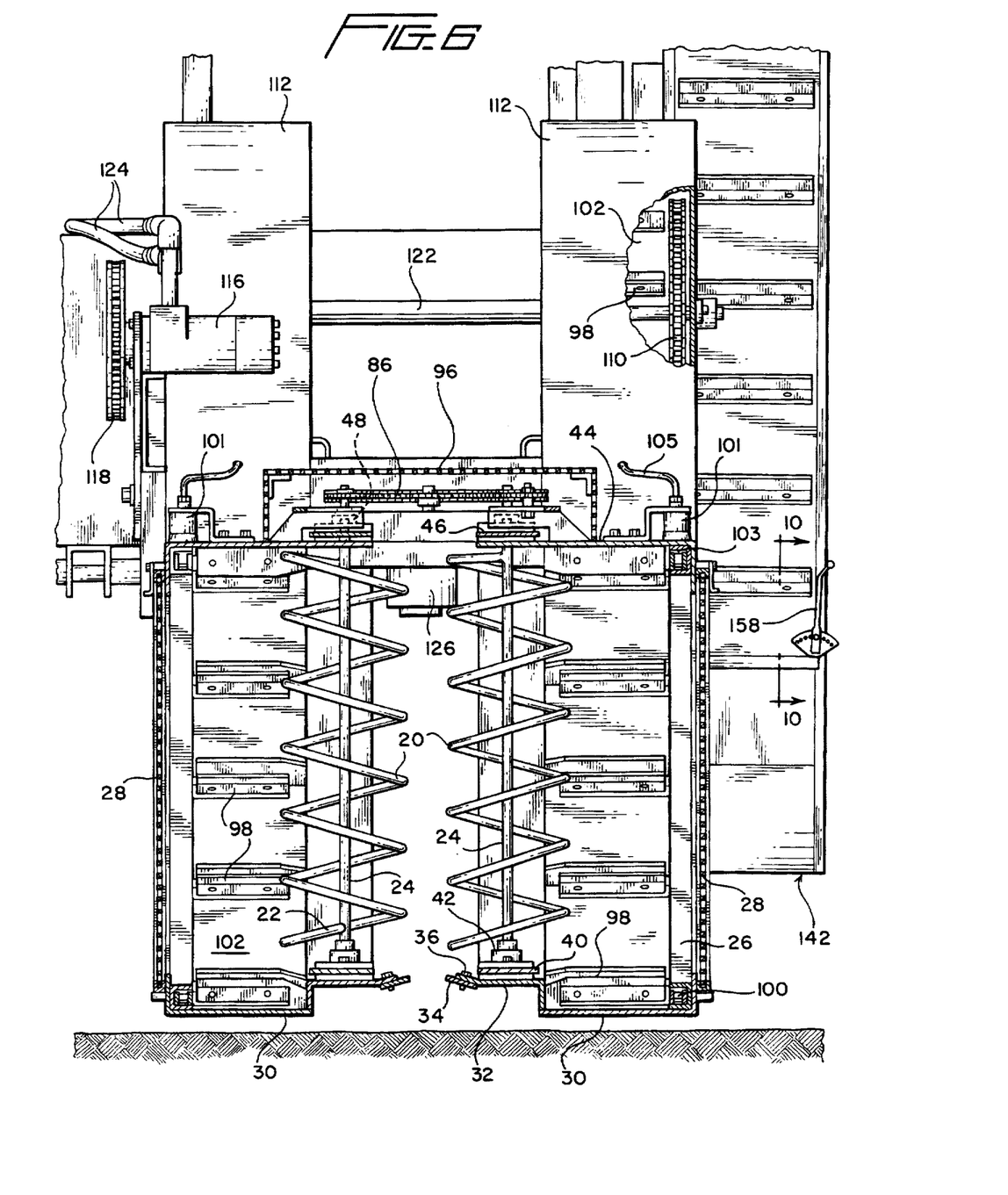
FIG. 6 is a transverse sectional view taken substantially along section line 6—6 on FIG. 3 illustrating further structural details of the picker unit.

Each picker unit 18 includes opposed rows of spiral picking coils 20 as illustrated in FIGS. 4 and 5. FIG. 3 illustrates four vertically disposed spiral coils 20 in each row of picking units with the rows of picking units being disposed along opposite sides of the picker unit 18 to receive the chili pepper plants therebetween as the picker unit 18 moves forwardly as illustrated by the arrow in FIG. 5. Each spiral coil 20 is in the form of a spiral rod having a radially inwardly extending end portion 22 rigidly affixed to a central vertical shaft 24 as illustrated in FIGS. 3, 5 and 6. Each picker unit 18 includes an outer vertical frame 26 supporting outer side walls 28 in the form of wire mesh or reticulated material forming a closure for the outer walls of the picker unit 18. The bottom of the picker unit 18 is provided with an inwardly extending bottom member 30 supported from the frame 26 and including an upwardly offset bottom member 32 at the inner edge of bottom member 30 to form a support for the lower ends of the shafts 24 of the coils 20 as illustrated in FIG. 6. The inner edge of the upwardly offset wall portion 32 is provided with an inclined plate 34 which inclines upwardly and inwardly. The inclined plate 34 is adjustably secured in lateral adjusted relation by fasteners 36 extending through slots to enable the plates 34 to be adjusted toward and away from each other to provide a slot-like passageway 38 for the stalks of the chili pepper plants passing through the picker units 18.

As illustrated in FIG. 6, the spiral coils 20 are spaced apart a distance generally equal to the width of the passageway 38. Positioned on the bottom wall 32 is a mounting plate 40 for bearing 42 which support the lower end of the shaft 24. The top of the picker unit 18 is provided with a top wall 44 which supports a mounting plate 46 for the upper ends of the shafts 24 which are journaled in bearings 48 supported from the mounting plate 46.

Figure 11:
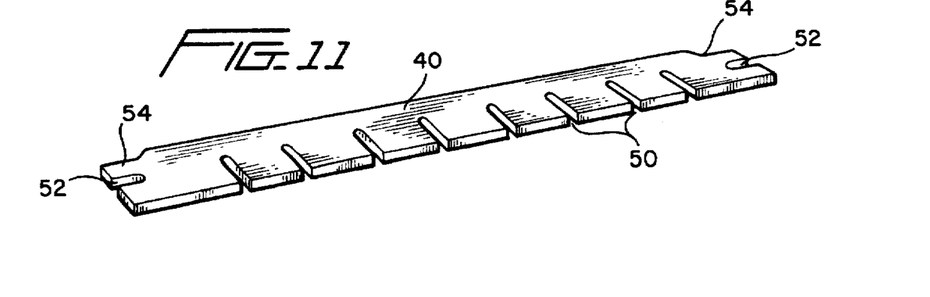
FIG. 11 is a perspective view of the mounting plate for each end of the spiral coils to enable adjustment of the coils individually or simultaneous with respect to the coils on the other side of a picking unit.

FIG. 11 illustrates the structure of the mounting plate 40 which includes a plurality of lateral slots 50 extending inwardly from one edge of the elongated plate 40. The end edges of the plate 40 includes an inwardly extending slot or notch 52 and the corner edges of the plate 40, opposite to the slots 50 are notched or recessed at 54 and the notched corners 54 face inwardly as illustrated in FIG. 5. The upper plate 46 is of similar structure. The slots 50 receive mounting bolts 56 to attach the bearing 42 to the plate 40. This enables each individual bearing 42 at the lower end of the shaft 24 to be adjusted laterally in relation to the plate 40 and locked in place by use of the bolts 56. The upper end of the shaft 24 is individually adjustable in the same manner in order for the bearings on each shaft 24 to be simultaneously adjusted and locked in place in relation to the lower mounting plate 40 or the upper mounting plate 46.

Each of the top and bottom mounting plates are movable laterally inwardly or outwardly as indicated by the arrows in FIG. 5 to move all of the coils 20 toward or away from each other. The structure for moving the plates 40 and 46 inwardly and outwardly is an elongated vertically disposed shaft 58 at each end of the plates 40 and 46 with the shafts being journaled in bearing sleeves 60 attached in vertical alignment to an end wall structure 62. The lower end of the shaft 58 is provided with an offset eccentric rod 64 received in the notch 52 in the plate 40. The upper end of each shaft 58 is provided with a similar eccentric rod 66 received in the notch in the end of the plate 46. At the upper end of the shaft 58, a portion of the shaft is broken away at 68 with the spaced portions being connected by a connector 70 which enables the plate 46 to move laterally inwardly and outwardly through the space 68.

Figures 7, 8, 9, 10:
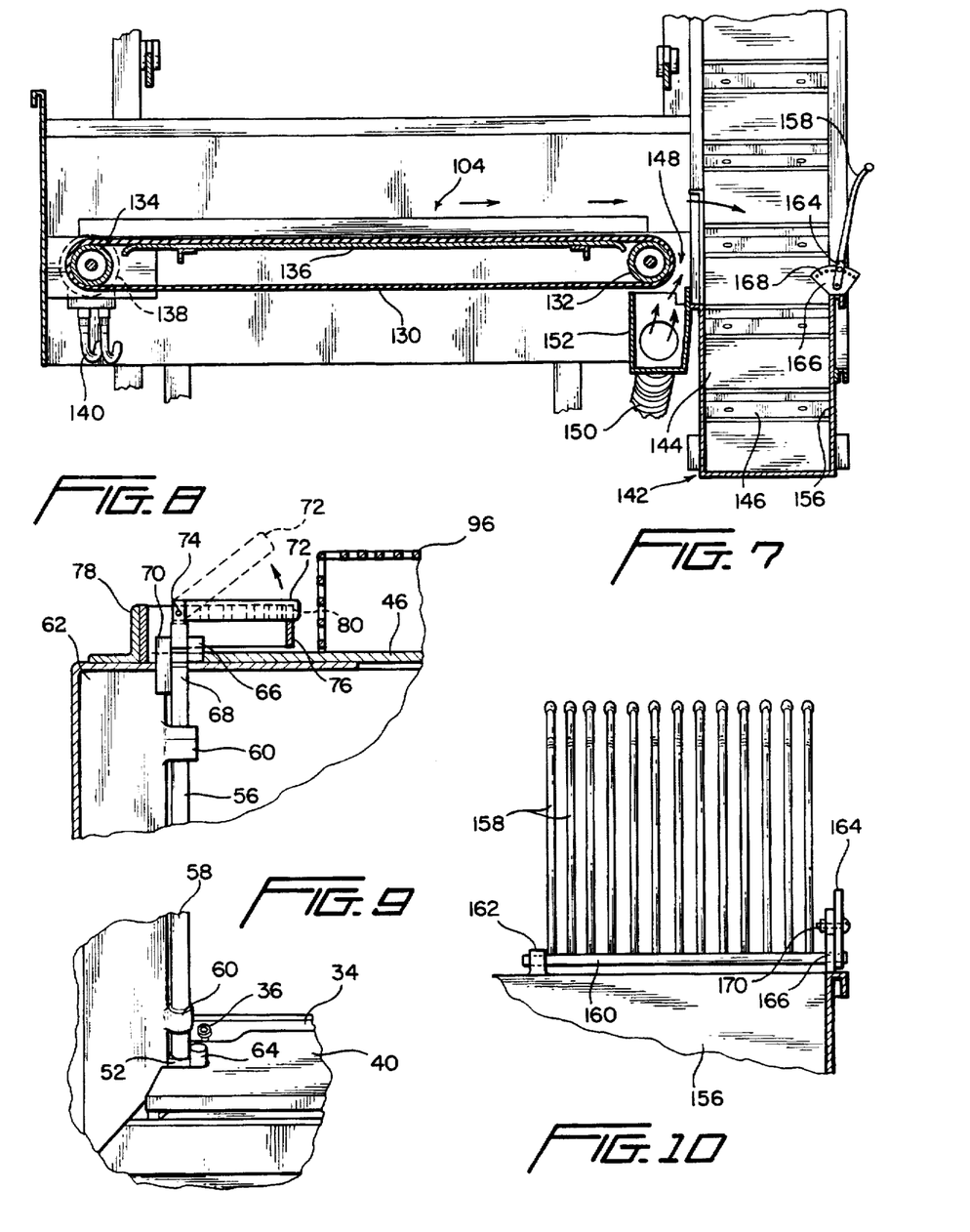
FIG. 7 is a transverse sectional view taken substantially along section line 7—7 on FIG. 3 illustrating the structure of the transverse conveyor, the air gap at the discharge end of the transverse conveyor and the finger structure spaced from the discharge end of the transverse conveyor to limit outward movement of material discharged on an upwardly inclined conveyor.
FIG. 8 is a detailed fragmental sectional view taken along section line 8—8 on FIG. 4 illustrating the structure for adjusting the spiral picker coils.
FIG. 9 is a fragmental prospective view illustrating the lower end of the structure for adjusting the spiral coils.
FIG. 10 is a sectional view taken substantially along section line 10—10 on FIG. 6 illustrating further structural details of the fingers which retain the chili pods discharged from the transverse conveyor and which may be picked up by the air flow as they pass through the air gap.

The upper end of the shaft 58 is provided with a laterally extending handle 72 pivoted to the upper end of the shaft by a pivot member 74 to enable the handle 72 to pivot from a generally horizontal position parallel to the plate 46 to an upwardly inclined or upwardly extending position as illustrated by broken line in FIG. 8. With this structure, the handle 72 can be moved in a rotatable path when it is in an inclined position thus rotating the shaft 58 so that the eccentrics 64 and 66 will move the upper and lower plates 40 and 46 inwardly in unison thus moving all of the spiral coils 20 on each side of the picker unit 18 toward and away from each other simultaneously. In order to lock the shaft 58 in adjusted position, an arcuate flange 76 is mounted on an end frame member 78. The arcuate flange has a center corresponding with the center of rotation of the shaft 58 and is provided with a plurality of vertical notches 80 therein to receive the lower edge portion of the handle 72 when in a generally horizontal position as illustrated in FIG. 8 thus locking the handle 72 against rotational movement thereby locking the shaft 58 and thus the upper and lower plates 40 and 46 in laterally adjusted relation. FIG. 5 illustrates the movement of the plates and the inwardly adjusted and outwardly adjusted position of the spiral coils as indicated by broken lines. Thus, the space between opposed spiral coils may be adjusted depending upon the conditions encountered when harvesting chili peppers.

As illustrated in FIGS. 4 and 6, each of the shafts 24 having the spiral coils 20 mounted thereon extend upwardly beyond the upper bearings 48 and each shaft includes a sprocket gear 82 thereon for engagement by a continuous sprocket chain 84 which is entrained over a drive sprocket gear 86 at an inner end of the picker unit 18 and entrained over an idler sprocket gear 88 at the forward end of the picker unit 18 and intermediate sprocket gears 90 between certain of the sprocket gears 82. With the endless construction of the sprocket chain 84 and the association of the sprocket gears with the drive chain 84, the coils on one side of the picking unit 18 rotate in one direction and the spiral coils on the other side rotate in the opposite direction with the coils rotating in a direction to engage the chili pepper plants in a manner to move the leaves and chili pepper pods upwardly for separating the pods from the chili pepper plants and depositing the chili pods laterally outwardly of the rotating spiral coils. The idler sprocket 88 is located generally in alignment with one row of spiral coils and the idler sprocket gears 90 are oriented between the coils nearest the drive sprocket gear 86. The idler gears 88 and 90 are supported from a bracket structure 92 having slots 94 therein to receive the shaft and fastening arrangement to adjustably support the sprocket gears to enable the drive chain 84 to be kept in a taut condition even though the spiral coils 20 may be adjusted laterally in relation to each other. As a safety measure, all of the sprocket gears, the sprocket chain and other structure at the upper end of the picker unit are enclosed by a heavy screen, expanded metal or reticulated material 96 rigidly affixed to the top of the picker unit or the reticulated material may be removably attached to provide access to the sprocket gears and chain for repair, lubrication and the like.

Positioned alongside of and outwardly from the bottom of the spiral coils 20 is a plurality of paddles 98 which are movable along the upper surface of the bottom wall or member 30. The outer frame 26 is in the form of an inwardly facing channel shaped member receiving an endless sprocket chain 100 to which one end of the paddles 98 are attached. The paddles 98 extend along the surface of the bottom wall 30 and also extend along the upper surface of an inclined extension 102 of the bottom wall 30 which extends upwardly to a point overlying a transverse conveyor generally designated by reference numeral 104. As shown in FIG. 3, the upper end of the wall 102 curves outwardly and downwardly at 106 over a side wall 108 of the conveyor 104 to deposit all material removed from the chili pepper plants onto the conveyor 104. The sprocket chain 100 extends over a drive sprocket gear 110 and extends downwardly along the inner surface of a downwardly inclined front wall 112 which joins with the top wall 44 of the picker unit 18. At the forward top of the picker unit 18, the chain 100 extends downwardly against the inner surface of a front wall 114 to the lower front corner of the picker unit and then rearwardly in channel shaped member 26 along the inner surface of the bottom wall 30 as illustrated in FIG. 3. A lubricator 101 is provided for each sprocket chain 100 which is oriented at the rearward end of the top wall 44 and includes a brush 103 engaging the top surface of the chain 100 and a supply line 105 provides pressurized lubricant to the lubricator 101. A control in the cab is used to operate the lubricator. With this construction, the material discharged laterally from the rotating spiral coils will be moved along the inner surfaces of the bottom wall 30 and inclined wall 102 for discharge onto the transverse conveyor 104.

A hydraulic drive motor 116 is mounted at an upper end of the picker unit and includes an output sprocket gear 118 driving a sprocket chain 120 which drives a shaft 122 that has the two sprocket gears 110 mounted thereon thus driving both chains 100 and the paddles from the hydraulic drive motor 116 receiving hydraulic fluid pressure through supply and return hoses 124 in a wall known manner with control valves being provided in the cab for operating the hydraulic motor 116. A hydraulic motor 126 suspended from the frame below the drive sprocket 86 drives the drive sprocket 86 and the sprocket chain 84 for rotating all of the spiral coils 20 with hydraulic hoses 128 supplying hydraulic pressure to the hydraulic motor in a conventional manner. The controls in the cab may be used to vary the speed of rotation of the spiral coils and also vary the speed of the paddles and chains 100 to which the paddles are attached thereby controlling operation of the chili pepper harvester in order to optimize the picking efficiency.

FIG. 7 illustrates the construction of the transverse conveyor 104 which receives the material from the paddles 98 as the paddles pass above the curved upper edge 106 of the inclined bottom wall 102 as illustrated in FIG. 3. The transverse conveyor 104 includes a belt conveyor 130 entrained over a pair of end rollers 132 and 134 with the upper run of the belt conveyor being supported by a slider bed 136. The roller 134 is driven by a hydraulic motor 138 communicated with hydraulic hoses 140 connected with a supply of hydraulic pressure and a control structure in the cab 16 of the harvester. The transverse conveyor 104 extends transversely across all four of the paddle conveyors for receiving all material moved upwardly along the inclined bottom wall 102 of each of the paddle conveyors. The material received on the conveyor 104 is moved transversely and discharged onto an upwardly and rearwardly extending conveyor 142 which includes a conveyor belt 144 with cleats or paddles 146 thereon. This conveyor is similar to the conveyor 30 in U.S. Pat. No. 5,210,999 and serves the same purpose by taking the material rearwardly for positioning in a rotatable separating drum, the details of which are the same as in the above mentioned patent number.

The relationship of the discharge of the transverse conveyor 104 and the conveyor 144 is illustrated in FIG. 7 with the material passing from the conveyor 104 onto the conveyor 142 passing over and through an air gap 148 which has air flowing upwardly therethrough from an air duct 150 through a deflector structure 152 which discharges air upwardly and toward the conveyor 142 and through the air gap 148 as indicated by the arrows in FIG. 7. The air duct 150 is connected to a fan 154 positioned below the cab 12 and hydraulically powered and controlled from the cab. This structure provides an air blast separator for removing lightweight leaves and other debris and discharging it laterally of the upwardly and rearwardly extending conveyor 142. The conveyor 142 includes an outer wall 156 forming a portion of a receiving chute for the material discharged from the transverse conveyor 104. Mounted on the upper edge of the outer wall is a plurality of spaced fingers 158 mounted on a supporting rod 160 journaled from bearing supports 162. The rod 160 includes a laterally extending member 164 on an outer end thereof associated with an arcuate plate 166 rigid with the wall 156. The plate 166 is provided with a plurality of arcuately spaced apertures 168 therein for removably receiving a fastening bolt 170 extending through the member 164 and the arcuate plate 166 to secure the upwardly extending fingers in angular relation. This enables air and debris to pass through the space between the fingers and also upwardly over the fingers which are slightly outwardly curved while retaining any chili pepper pods that may not have fallen into the inlet chute of the upwardly extending conveyor 142 thus forming an adjustable separation for lightweight leaves and other debris from the chili pods prior to the chili pods moving up the conveyor 142 into the drum separator.

Extending forwardly from the picker units 18 is a pair of leaf lifters generally designated by reference numeral 172 which are generally in the form of right triangular members having an upwardly facing edge 174 extending downwardly and forwardly from the front wall 114 of each picker unit. The leaf lifter includes an inner wall 176 and an outer wall 178 which are interconnected by the top wall to provide a hollow unit which may be closed on the bottom and provided with a ground engaging shoe 180 at the forward lower end thereof. The rearward bottom edge of the inner wall 176 includes a deflector plate 182 oriented generally horizontally for assisting the leaf lifter in guiding all of the plants and leaves of the chili pepper plants into the picker unit. The rearward edge of the inner wall 176 generally is aligned with but slightly outwardly of the inclined peripheral edge 184 of the front wall 114 to define an entrance area 186 between each pair of leaf lifters 172 for guiding the pepper plants into the picker units.

The leaf lifters 172 are adjustably supported by a chain 188 connected to the interior surface of the inner wall with the chain links extending through a support plate 190 mounted on the front wall 114 and provided with a keyhole slot 192 to adjustably support the leaf lifter in vertically adjusted position as illustrated in FIG. 3. Also, the leaf lifter 172 and the front wall 114 of the picker unit are interconnected by a plurality of support arms 194 which extend upwardly and rearwardly from their point of attachment with the leaf lifter to their point of attachment with a bracket 196 mounted on the front wall 114 of the picker unit thus floatingly supporting the weight of the leaf lifters so that they will more effectively follow the contour of the ground surface and even if the bottom of the leaf lifter comes into contact with the ground surface, the leaf lifter will move upwardly without the nose end 180 digging into the ground surface. The down position or lowest position of the leaf lifters is controlled by the length of the chain 188 and tension springs can be provided between the leaf lifters and wall 114 to enable floatation of the leaf lifters.

The spiral coil picker units are adjustable toward and away from each other as set forth previously which provides for cleaner picking of the product from the plant. Plant varieties and growing seasons as well as farming practices control growth and stage of green leaves or dry leaves after frost with the adjustment of the spiral coil picking units enabling maximum crop to be harvested from the plants in the field. The adjustment of the spiral coil picker units can be easily performed by the operator in the field with very little appreciable down time of the machine.

The pepper pods picked from the plants are deposited laterally outwardly in relation to the spiral coil picker units and the paddles move the picked pepper pods from the picker units to the transverse conveyor 104. The paddles 98 are attached to the chain 100 at the outer ends of the paddles with the inner edges of the paddles being inclined slightly with the paddles moving upwardly along with the chain along the surface of the inclined bottom 102 with the chain and paddles passing over the sprocket gear 110 and the material being conveyed along the surface of the inclined bottom member 102 being deposited onto the transverse conveyor 104. Inasmuch as the paddles 98 are attached to and supported from the chain at only one end thereof, the paddles 98 are supported by a guide brace 198 as they pass the upper ends of the spiral coil picker units 20 to keep the paddles from hitting the top of the picker units. The spiral coils may vary in size but have preferably a diameter of about 8 inches with a height of approximately 24 inches and approximately 6 convolutions. The pepper plants are guided into the entranceway 186 by the leaf lifters 172 and the inclined walls 184 and pass through the space 38 as the spiral coils engage and remove the chili pepper pods. Four spiral picking coils 20 are positioned along each side of the area 38 through which the pepper plants pass. The fourth or innermost spiral picking coil is provided with a shield 200 which partially encloses the spiral picking coil which prevents the spiral picking coil from throwing chili pods out the back into the row and deflects the chili pods picked down into the paddles to be moved to the transverse conveyor.

Air flow through the duct 150 to the air gap 148 may be controlled by a manually pivotal and adjustable baffle which controls the velocity of air to blow trash from the chili product as it falls from the transverse conveyor into the upwardly inclined conveyor with the fingers 158 retaining chili pods while permitting leaves and trash to escape. The chili pods fall down onto the upwardly and rearwardly extending conveyor for discharge into the rotating separator drum for travel through the remainder of the chili pepper harvester as disclosed in U.S. Pat. No. 5,210,999.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A picker unit for removing pod products from row plants by advancing along a row of plants, said unit comprising a pair of generally parallel, laterally spaced, vertically disposed, spirally coiled, pod removing devices, a frame rotatably supporting said pod removing devices, a drive system rotatably driving said pod removing devices in counterrotating directions, adjustment means interconnecting the pod removing devices and frame for simultaneous and equal lateral movement of upper and lower ends and front and rearward ends of each pod removing device and a conveyor oriented on the frame outwardly of each pod removing device receiving pods removed from the plants and conveying them away from the picker unit.

2. The picker unit as defined in claim 1 wherein each said conveyor includes a slider bed mounted outwardly of the pod removing device, a chain mounted along the outer edge of the slider bed in relation to the spirally coiled pod removing devices and a plurality of paddles having one end thereof mounted on said chain and moving along the slider bed for moving pods removed from the plants along the surface of the slider bed, said slider bed extending horizontally throughout the length of the picking units and then upwardly and rearwardly, a transverse conveyor receiving material from the rearwardly and upwardly extending slider bed and moving it transversely of the picker unit for discharge through an air gap, said air gap including a pressurized air flow path therethrough for entraining and removing trash, leaves and lightweight debris from the pod product.

3. The picker unit as defined in claim 1 wherein each pod removing device includes a spiral rod having multiple convolutions of generally the same diameter, said spiral rod including end convolutions which terminate in radially and inwardly extending ends, a support shaft extending centrally of said spiral rod, said inwardly extending ends of said spiral rod being connected to said shaft, an adjustable support at each end of each shaft to independently adjust each shaft laterally of the picker unit thereby enabling independent lateral adjustment of the spiral rods.

4. A picker unit for removing pod products from row plants by advancing along a row of plants, said unit comprising a pair of generally parallel, laterally spaced, vertically disposed, spirally coiled, pod removing devices, a frame rotatably supporting said pod removing devices, a drive system rotatably driving said pod removing devices in counterrotating directions, adjustment means interconnecting the pod removing devices and frame for simultaneous and equal lateral movement of upper and lower ends of each pod removing device and a conveyor oriented on the frame outwardly of each pod removing device receiving pods removed from the plants and conveying them away from the picker unit, each pod removing device including a plurality of spiral rods supported from the frame and oriented along opposite sides of a row of plants passing through the picker unit, a support at the top and bottom of each row of pod removing devices including a longitudinally extending plate having an inwardly extending notch in each end, a vertically elongated rod mounted on the frame and including an eccentric engaged with the notches in the top and bottom mounting plates at each end of the picker unit, each of said rods extending above the frame and including a lateral handle to enable the rods to be pivoted to move the eccentrics in a circular path and move the plate laterally toward and away from plants passing through the picker unit and a latch structure securing the handle in rotatably adjusted position for securing the support plates in adjusted position thereby adjusting the spirally coiled pod removing devices inwardly and outwardly in opposed relation while maintaining the pod removing devices in parallel relation.

5. The picker unit as defined in claim 4 wherein each of said spirally coiled pod removing devices includes a central shaft, said spiral rod having spaced convolutions defining a generally cylindrical structure with the ends of the rod extending radially inwardly and connected with said shaft, said shafts being journaled in said top and bottom mounting plates, an upper end of each shaft extending above the top plate and being provided with a sprocket, an endless sprocket chain engaged with the sprockets for rotating the sprockets and spiral coiled pod removing devices on one side of the plants passing through the picker unit in one direction and rotating the pod removing devices on an opposite side of the plants in an opposite direction.

6. The picker unit as defined in claim 4 wherein a pair of forwardly projecting leaf lifters are supported on said frame with the leaf lifters diverging forwardly for guiding plants between the pod removing devices.

7. The picker unit as defined in claim 4 wherein each spiral rod includes a central shaft extending above said frame, said driving system including a sprocket mounted on an upper end of each shaft and a sprocket chain drivingly engaged with each sprocket.

8. The picker unit as defined in claim 7 wherein each said conveyor includes a slider bed mounted outwardly of the pod removing device, a chain mounted along the outer edge of the slider bed in relation to the spirally coiled pod removing devices and a plurality of paddles having one end thereof mounted on said chain and moving along the slider bed for moving pods removed from the plants along the surface of the slider bed, said slider bed extending horizontally throughout the length of the picking units and then upwardly and rearwardly, a transverse conveyor receiving material from the rearwardly and upwardly extending slider bed and moving it transversely of the picker unit for discharge through an air gap, said air gap including a pressurized air flow path therethrough for entraining and removing trash, leaves and lightweight debris from the pod product.

9. The picker unit as defined in claim 7 together with a lubricator mounted on said frame for discharging lubricant onto said chain.

10. A chili pepper harvester comprising a pair of chili pepper pod removing devices movable along opposite sides of a row of chili pepper plants, each pod removing device including a plurality of generally vertically oriented spiral rods oriented in generally parallel, spaced relation to receive pepper plants therebetween, a support for said spiral rods, a drive system for driving said spiral rods in a manner to lift chili pepper pods from a row of plants, and a conveyor moving picked pods away from the spiral rods, said support for said spiral rods including an adjustment moving top and bottom ends of all of said spiral rods at a forward end and a rearward end of each pod removing device simultaneously toward and away from a row of chili pepper plants.

11. The chili pepper harvester as defined in claim 10 wherein said support for said spiral rods includes an adjustment to enable independent adjustment of the upper and lower end of each spiral rod.

12. The chili pepper harvester as defined in claim 11 wherein said support includes an upper mounting plate and a lower mounting plate in each pod removing device, each spiral rod being supported by a central shaft, each central shaft including an upper end and a lower end journalled in said mounting plates, each spiral rod including spiral convolutions spaced from the central shaft, said adjustment moving top and bottom ends of all of said spiral rods at a forward end and a rearward end includes a vertically extending rod at the forward and rearward end of each pod removing device, each of said vertical rods including an eccentric engaged with the top and bottom mounting plates, said vertical rods being rotatable independently for independently moving the forward and rearward ends of the top and bottom mounting plate simultaneously inwardly and outwardly in relation to chili pepper plants passing between the pod removing devices.

13. The chili pepper harvester as defined in claim 12 wherein each of said vertical rods includes a handle on an upper end thereof to independently rotate the vertical rods, and a structure for latching each of said handles in an adjusted position to lock the vertical rods and the forward and rearward ends of the top and bottom mounting plates in adjusted position.

14. The chili pepper harvester as defined in claim 12 wherein said independent adjustment of the top and bottom ends of the central shafts includes a support bearing at the upper end and bottom end of each central shaft, said top and bottom mounting plates including slots extending transversely of the mounting plates, fastening devices extending through the slots and engaging the bearings to lock the bearings adjustably in transverse relation to the mounting plates thereby independently adjusting the top and bottom ends of each central shaft in relation to the mounting plates.

15. The chili pepper harvester as wherein in claim 10 wherein each pod removing device includes a conveyor for conveying chili pepper pods removed from the chili pepper plants onto a conveyor system having spaced conveyor structures defining an air gap, said air gap being communicated with a source of air pressure to separate lightweight debris from the chili pods as they pass through the air gap.

* * * * *

UNITED STATES PATENT AND TRADEMARK OFFICE
CERTIFICATE OF CORRECTION

PATENT NO. : 5,709,071
DATED : January 20, 1998
INVENTOR(S) : Robert O. COSIMATI It is certified that error appears in the above-identified patent and that said Letters Patent is hereby corrected as shown below:

Column 2, line 35, after "view" insert --taken--;
         line 61, cancel "simulataneous" and insert --simultaneously--.

Column 5, line 44, cancel "wall" and insert --well--.

Column 10, line 45, cancel "wherein" and insert --defined--.

Signed and Sealed this

Thirtieth Day of June, 1998

Attest:

BRUCE LEHMAN

Attesting Officer

Commissioner of Patents and Trademarks